United States Patent
Cho et al.

(10) Patent No.: US 7,210,629 B2
(45) Date of Patent: May 1, 2007

(54) PORTABLE COMMUNICATION DEVICE

(75) Inventors: Jin-Hee Cho, Suwon-si (KR); Byung-Sik Kim, Suwon-si (KR); Seung-Min Park, Seoul (KR); Chang-Soo Lee, Incheon (KR); Sung-Kwon Kim, Gwangmyeong-si (KR); Jun-Sang Park, Anyang-si (KR); Jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/851,804

(22) Filed: May 21, 2004

(65) Prior Publication Data

US 2004/0245342 A1 Dec. 9, 2004

(30) Foreign Application Priority Data

Jun. 5, 2003 (KR) ............. 10-2003-0036391
Sep. 2, 2003 (KR) ............. 10-2003-0061236

(51) Int. Cl.
*G06K 7/10* (2006.01)
*G06K 7/14* (2006.01)
*G03B 19/00* (2006.01)
*G03B 29/00* (2006.01)
*G03B 17/48* (2006.01)

(52) U.S. Cl. .............. 235/454; 396/429; 455/556.1; 455/575.4; 348/14.02; 348/374; 348/375

(58) Field of Classification Search ......... 235/472.01, 235/472.02, 454; 455/575, 550, 566, 556.1, 455/575.1; 396/535, 374, 176, 177, 178, 396/429; 348/14.02

See application file for complete search history.

(56) References Cited

U.S. PATENT DOCUMENTS

| 4,998,318 | A | * | 3/1991 | Nohtomi et al. ............. 16/441 |
| 5,612,732 | A | * | 3/1997 | Yuyama et al. ........... 348/14.01 |
| 5,815,759 | A | * | 9/1998 | Tseng et al. ................ 396/541 |
| 5,920,061 | A | * | 7/1999 | Feng ..................... 235/472.01 |
| 6,266,090 | B1 | * | 7/2001 | Tseng et al. ................ 348/335 |
| 6,285,833 | B1 | * | 9/2001 | Yamane .................... 396/177 |
| 6,370,362 | B1 | * | 4/2002 | Hansen et al. ........... 455/550.1 |
| 6,389,233 | B2 | * | 5/2002 | Kawando ................... 396/177 |

(Continued)

FOREIGN PATENT DOCUMENTS

JP 10-075287 3/1998

(Continued)

*Primary Examiner*—Jared J. Fureman
*Assistant Examiner*—Thien Mai
(74) *Attorney, Agent, or Firm*—The Farrell Law Firm

(57) ABSTRACT

A portable communication device includes a first housing extending in a first direction, a second housing extending in a second direction perpendicular to the first direction and formed at a bottom surface of the first housing so that a predetermined region of an outer circumferential surface of the second housing protrudes perpendicularly outward from the bottom surface of the first housing, and a camera lens module rotatably or linearly movably mounted in the second housing. The camera lens module is inserted into or drawn out from the second housing in the second direction. The camera lens module is repeatedly inserted into and drawn out from the second housing by pushing the camera lens module, and the camera lens module moves upward and downward when it is drawn out from the second housing.

24 Claims, 21 Drawing Sheets

U.S. PATENT DOCUMENTS

| | | | |
|---|---|---|---|
| 6,812,958 B1 * | 11/2004 | Silvester | 348/207.1 |
| 6,832,717 B1 * | 12/2004 | Silverbrook et al. | 235/380 |
| 6,832,724 B2 * | 12/2004 | Yavid et al. | 235/454 |
| 6,832,729 B1 * | 12/2004 | Perry et al. | 235/472.01 |
| 6,876,379 B1 * | 4/2005 | Fisher | 348/14.02 |
| 2001/0036845 A1 * | 11/2001 | Park | 455/566 |
| 2002/0001467 A1 * | 1/2002 | Tanaka et al. | 396/177 |
| 2004/0204126 A1 * | 10/2004 | Reyes et al. | 455/566 |
| 2004/0242289 A1 * | 12/2004 | Jellicoe et al. | 455/575.1 |

FOREIGN PATENT DOCUMENTS

| | | |
|---|---|---|
| WO | WO 02/076067 | 9/2002 |

* cited by examiner

PORTABLE COMMUNICATION DEVICE

PRIORITY

This application claims priority to an application entitled "PORTABLE COMMUNICATION DEVICE", filed in the Korean Intellectual Property Office on Jun. 5, 2003 and assigned Serial No. 2003-36391, and to an application entitled "PORTABLE COMMUNICATION DEVICE", filed in the Korean Intellectual Property Office on Sep. 2, 2003 and assigned Serial No. 2003-61236, the contents of which are incorporated herein by reference.

BACKGROUND OF THE INVENTION

1. Field of the Invention

The present invention relates generally to a portable communication device including cellular phones, personal digital assistants and hand held phones, and more particularly to a portable communication device with a camera lens module inserted thereinto or drawn out therefrom in a pop-up fashion.

2. Description of the Related Art

Generally, "portable communication devices" are electronic devices that are portable and enable users of the devices to communicate wirelessly. The portable communication devices have tended not only toward compactness, slimness and lightness, but also portability. Furthermore, such portable communication devices have been adapted to multimedia, whereby the devices have various additional functions. Additionally, the portable communication devices will be miniaturized, lightweight, multipurpose devices with various functions, which will be modified to be suitable for various multimedia and Internet environments. The portable communication devices are electronic devices commonly used by people of all ages and both sexes all over the world, which are considered as necessities of life.

On the basis of their forms, the portable communication devices may be classified into several types of communication devices. The portable communication devices may be classified into a bar-type communication device, a flip-type communication device, and a folder-type communication device. The bar-type communication device has a bar-type single housing, the flip-type communication device has a bar-type housing and a flip part pivotably attached to the housing, and the folder-type communication device has a bar-type housing and a folder part pivotably attached to the housing. On the basis of a position at or a way in which a user puts it on the device, the portable communication devices may be classified into a necklace-type communication device and a wrist-type communication device. The necklace-type communication device is worn on the neck of a user using a string, and the wrist-type communication device is worn around the wrist of the user. On the basis of ways of opening or closing the terminals, the portable communication devices may be classified into a rotation-type communication device and a sliding-type communication device. In the rotation-type communication device, two housings are rotatably connected to each other while the housings are continuously opposite to each other. The rotation-type communication device is opened or closed by the rotation of the two housings, and the housings are rotated apart from or close to each other. In the sliding-type communication device, two housings longitudinally slide. The sliding-type communication device is opened or closed by the sliding movement of the two housings, and the housings slide apart from or close to each other. The above-described various types of communication devices will be known by a person having an ordinary skill in the art to which the present invention pertains.

The portable communication devices have also been adapted to transmit/receive data at high speed in addition to an audio communication function. Consequently, the portable communication devices will use wireless communication technology for transmitting data at high speed, which will satisfy the increasing desires of the users. It is another increasing trend that a camera lens is adopted in each portable communication device to transmit image signals. The portable communication device has a camera lens module mounted outside or inside a main body of the portable communication device so that a user of the device can talk with another user of the device while looking at each other, or take pictures of his/her desired subjects.

However, the camera lens module of the conventional portable communication device is not protected from the external environment. Thus, a camera lens of the camera lens module may be contaminated by foreign matter introduced in the camera lens module. Since the camera lens is exposed to the outside, it is preferable that the camera lens is protected by means of an additional protecting unit for protecting the camera lens from the external environment.

SUMMARY OF THE INVENTION

It is an object of the present invention to provide an inserting/drawing unit of a camera lens module of a portable communication device, which can hide the camera lens module from the outside when a camera lens of the camera lens module is not in use, thereby protecting the camera lens from the external environment.

It is another object of the present invention to provide an inserting/drawing unit of a camera lens module of a portable communication device, which can easily insert a camera lens into or draw out the camera lens from a main body of the portable communication device, whereby the inserting/drawing unit of camera lens module is conveniently used.

In accordance with one aspect of the present invention, the above and other objects can be accomplished by the provision of a portable communication device including: a first housing extending in a first direction; a second housing extending in a second direction perpendicular to the first direction and formed at a bottom surface of the first housing so a region of an outer circumferential surface of the second housing protrudes perpendicularly outward from the bottom surface of the first housing; and a camera lens module rotatably or linearly movably mounted in the second housing, the camera lens module being inserted into or drawn out from the second housing in the second direction, wherein the camera lens module is inserted into and drawn out from the second housing by pushing the camera lens module, and the camera lens module is movable upward and downward with respect to the second housing.

In accordance with another aspect of the present invention, there is provided a portable communication device including: an elongated housing; a camera lens module mounted in the housing, the camera lens module being inserted into or drawn out from the housing in the direction of pushing the camera lens module when it is pushed, the camera lens module being rotated in the direction of a hinge axis thereof when the camera lens module is drawn out from the housing; a rotary cam extending in the longitudinal direction of the camera lens module and attached to the camera lens module; a stopper cam mounted in the housing for releasably restricting the rotation of the rotary cam so that the camera lens module can be inserted into or drawn out from the housing as the camera lens module and the rotary cam are rotated together when the camera lens module is pushed; a bush ring mounted in the rotary cam, the bush ring having a rib for enabling a coupling part of a shaft attached to the camera lens module using a screw to be inserted therethrough; and a plurality of springs disposed in the housing for providing an elastic force necessary to insert the camera lens module into or draw out the camera lens module from the housing and for providing an elastic force necessary to separate the cameral lens module from the rotary cam.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
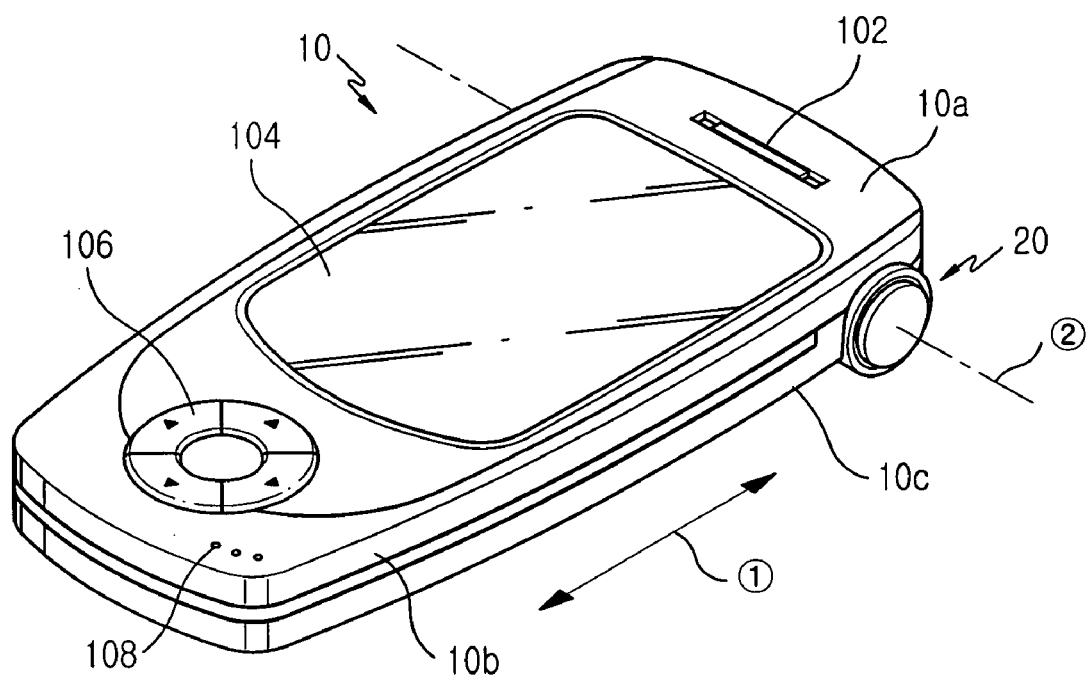
FIG. 1 is a perspective view of a portable communication device according to a preferred embodiment of the present invention.
Figure 2:
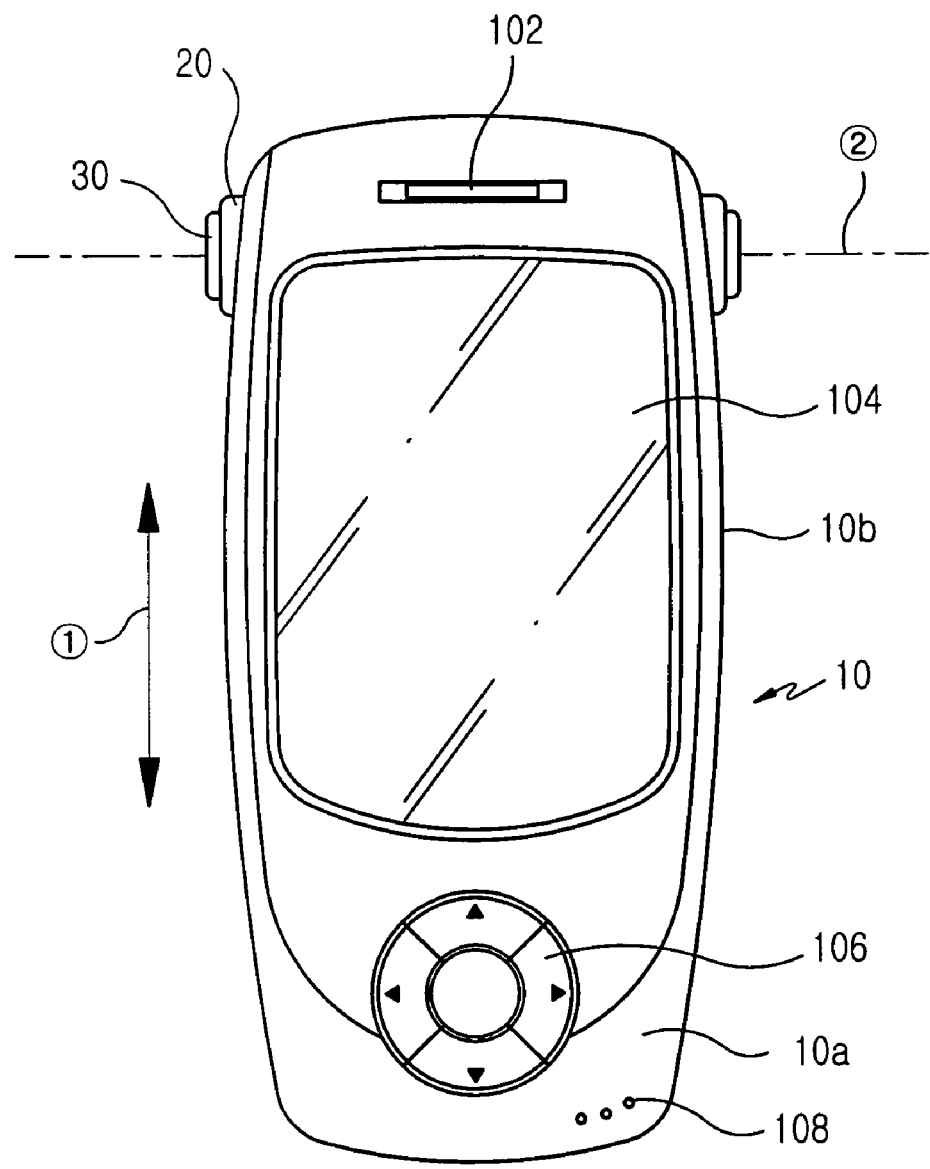
FIG. 2 is a front view of the portable communication device shown in FIG. 1.
Figure 3:
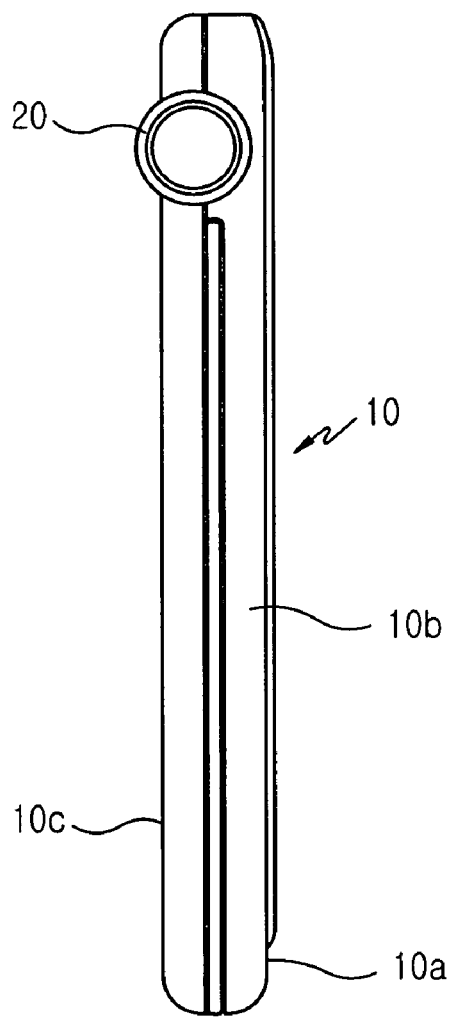
FIG. 3 is a side view of the portable communication device shown in FIG. 1.
Figure 4:
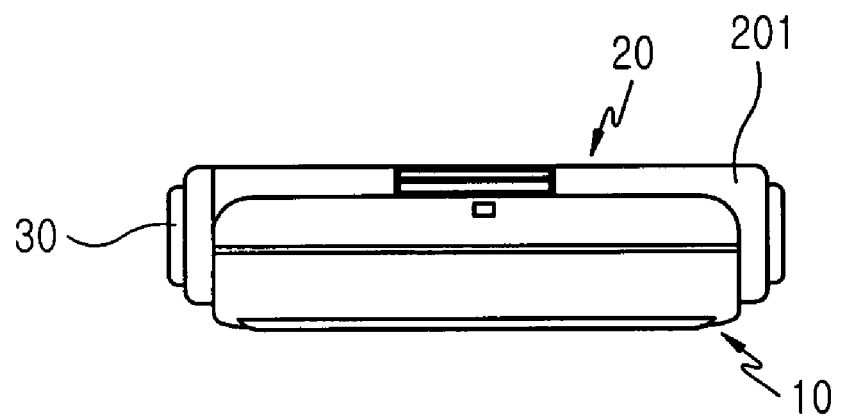
FIG. 4 is a bottom view of the portable communication device shown in FIG. 1.

Preferred embodiments of the present invention will be described in detail with reference to the accompanying drawings. In the drawings, the same or similar elements are denoted by the same reference numerals even though they are depicted in different drawings. In the following, a detailed description of known functions and configurations incorporated herein will be omitted for clarity where they are well known in the art.

As illustrated in FIGS. 1 to 4, a portable communication device according to a preferred embodiment of the present invention includes a first housing 10 extending in a first direction ①, and a second housing 20 extending in a second direction ②, which is perpendicular to the first direction ①. The second housing 20 is formed at a bottom surface 10c of the first housing 10. Thus, a portion of an outer circumferential surface of the second housing 20 protrudes outward from the bottom surface 10c of the first housing 10. In the second housing 20 is mounted a pop-up camera lens module 30, which is inserted into or drawn out from the second housing 20 at one side of the second housing 20. The first direction ① is a longitudinal direction along which the first housing 10 extends, and the second direction ② is a direction perpendicular to the first direction ①. The camera lens module 30 is rotated about the second direction ②. The camera lens module 30 is linearly moved along the second direction ②. The first housing 10 is formed in the shape of a bar or a plate. The first housing 10 includes a top surface 10a, the bottom surface 10c, and a pair of side surfaces 10b. On the top surface 10a of the first housing 10 are arranged a speaker unit 102, a display unit 104, a plurality of keys 106 and a microphone unit 108. The second housing 20 is preferably formed in the shape of a cylinder. A portion of the second housing 20 protrudes at a region of the bottom surface 10c of the first housing 10. The second housing 20 is disposed in the shape of a protruded jaw in the vicinity of the upper part of the bottom surface 10c of the first housing 10. Also, the second housing 20 extends between the side surfaces 10b of the first housing 10 in the second direction ②.

Figure 5A:
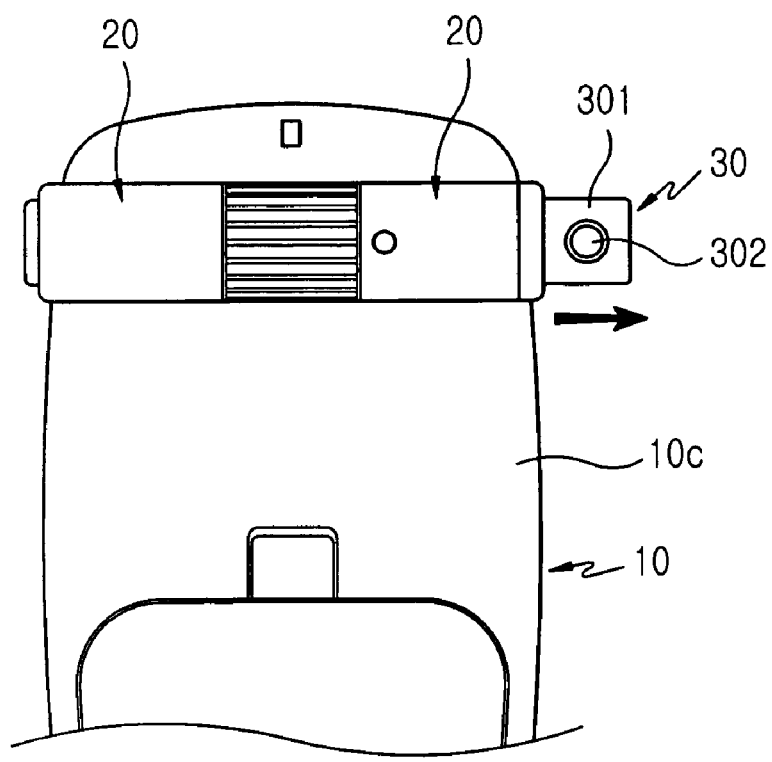
FIG. 5A is a rear view of the portable communication device of the preferred embodiment of the present invention with a camera lens module of the portable communication device withdrawn out from a main body of the portable communication device.
Figure 5B:
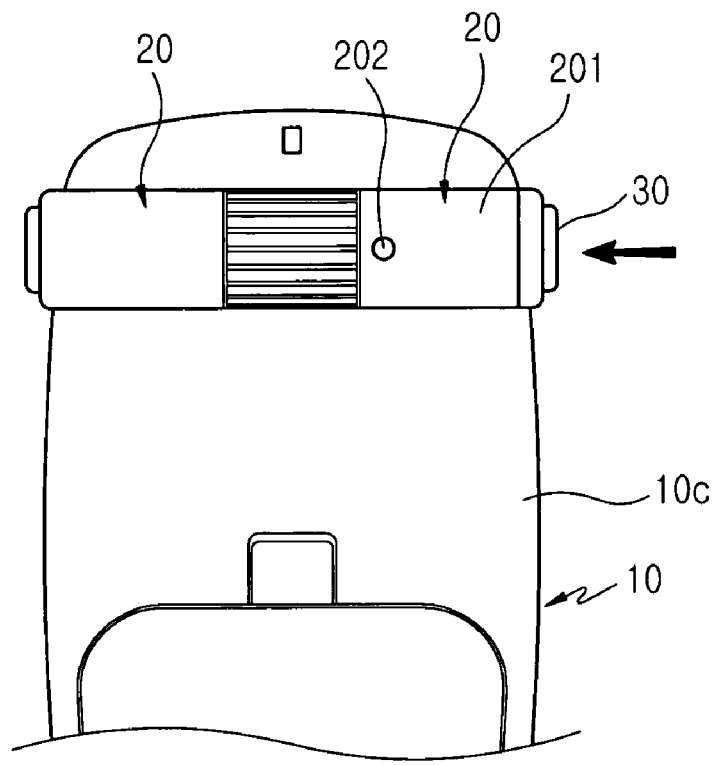
FIG. 5B is a rear view of the portable communication device of the preferred embodiment of the present invention showing the camera lens module of the portable communication device inserted into the main body of the portable communication device.

As illustrated in FIGS. 5A and 5B, the camera lens module 30 is formed in the shape of a cylinder, and the camera lens module 30 is inserted into or drawn out from the second housing 20 at one side of the second housing 20. The camera lens module 30 is mounted at one side of the second housing 20 in a pop-up fashion. When the camera lens module 30 is drawn out from the second housing 20, it is inserted into the second housing 20, using a force by a user of the portable communication device. When the camera lens module 30 is inserted in the second housing 20, it is drawn out from the second housing, using a force by a user of the portable communication device. The camera lens module 30 is inserted into or drawn out from the second housing 20 by pushing the camera lens module 30. The camera lens module 30 can be inserted into or drawn out from the second housing 20 by rotating the camera lens module 30. The camera lens module 30 can be automatically inserted into or drawn out from the second housing 20 using an additional operating button (not shown). The camera lens module 30 has a camera lens 302 mounted at a preferred region of the outer circumferential surface 301 thereof. When the camera lens module 30 is drawn out from the second housing 20, the camera lens 302 is also drawn out from the second housing 20. As described above, the camera lens module 30 can be rotated and linearly moved. The camera lens module 30 can be rotated about the second direction ②, and linearly moved in the second direction ②. The camera lens 302 is turned toward a subject by rotating the camera lens module 30. The camera lens module 30 is inserted into the second housing 20 by linearly moving the camera lens module 30 when it is not in use. The camera lens module 30 is drawn out from the second housing 20 by linearly moving the camera lens module 30 when it is to be used.

In addition, the second housing 20 is further provided at a middle part thereof with a lamp.

The operation of an inserting/drawing unit 100 (shown in FIG. 16) of the camera lens module 30 of the portable communication device with the above-described construction according to another preferred embodiment of the present invention will now be described with reference to FIGS. 6 to 20.

Figure 6:
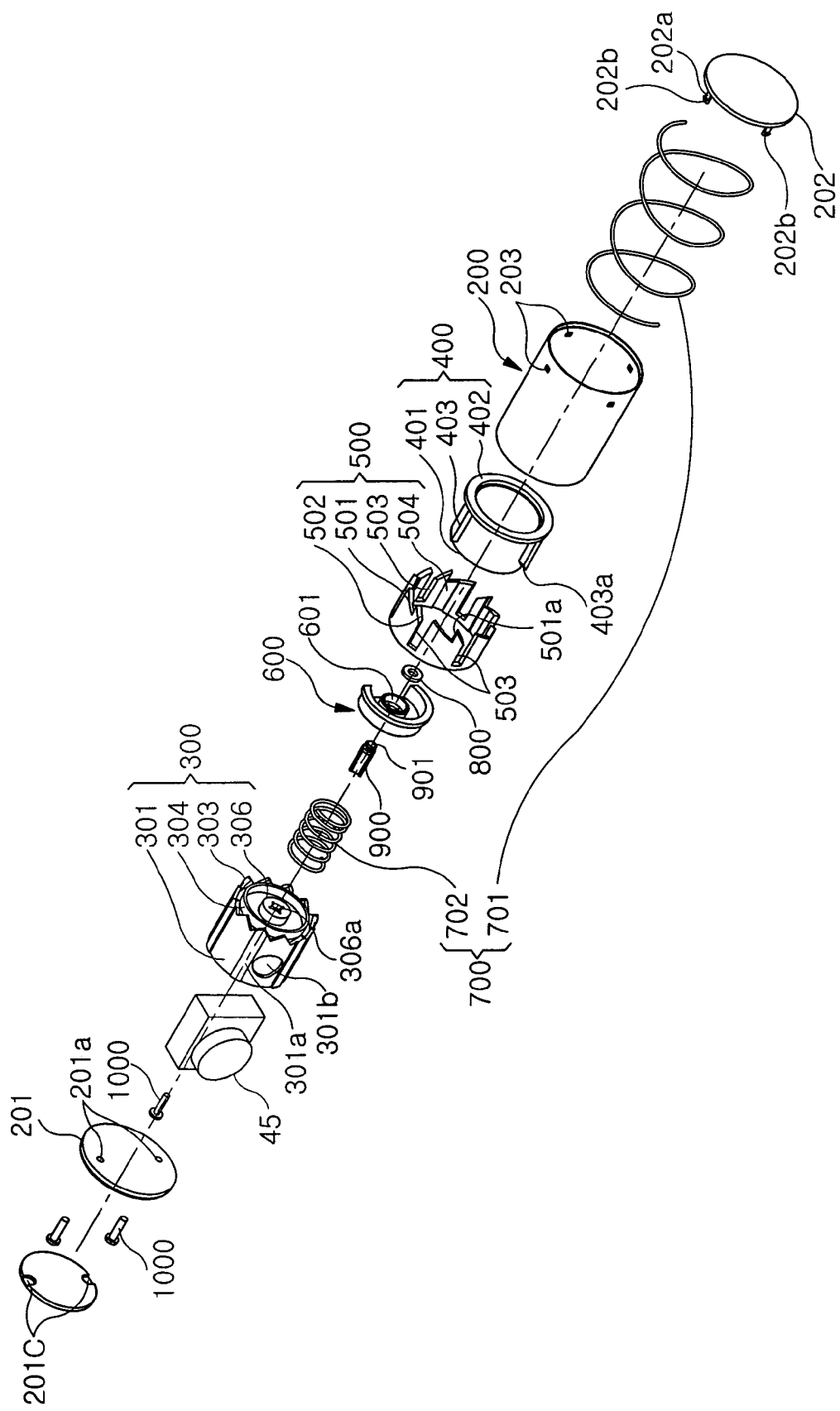
FIG. 6 is an exploded perspective view of an inserting/drawing unit of the camera lens module of a portable communication device according to another preferred embodiment of the present invention.
Figure 16:
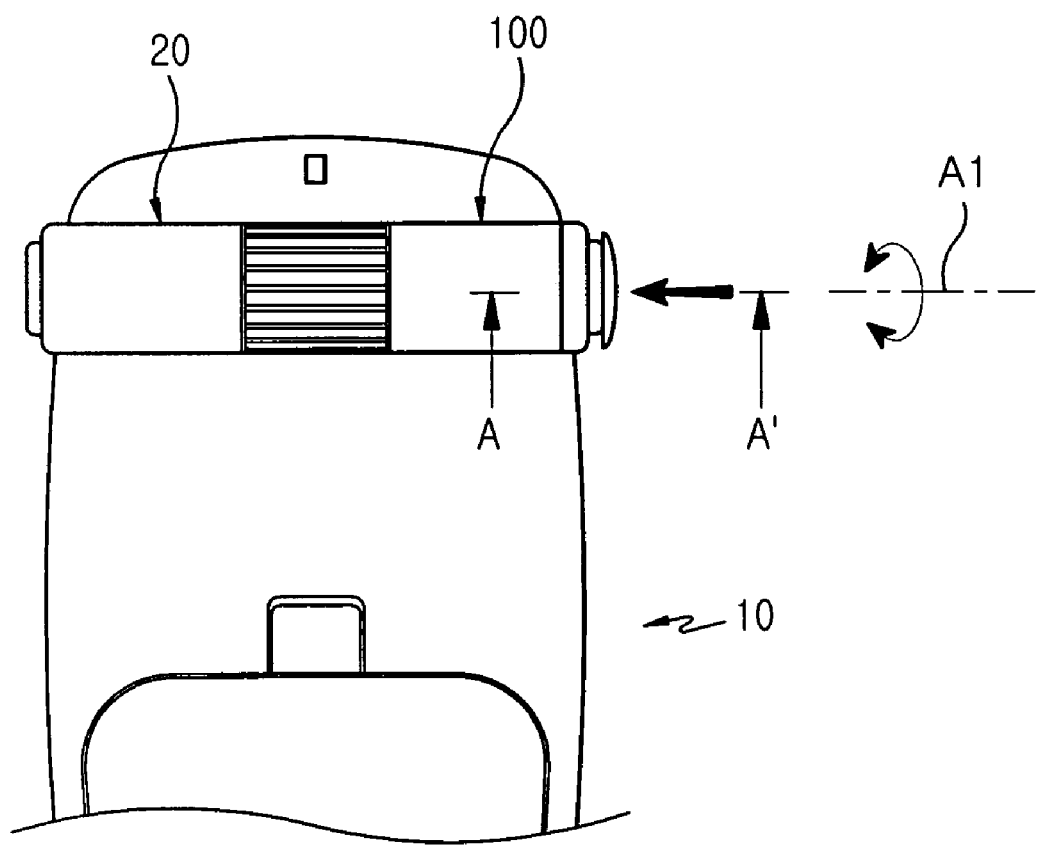
FIG. 16 is a rear view illustrating the inserting/drawing unit of the camera lens module according to the preferred embodiment of the present invention inserted into the main body of the portable communication device.
Figure 18:
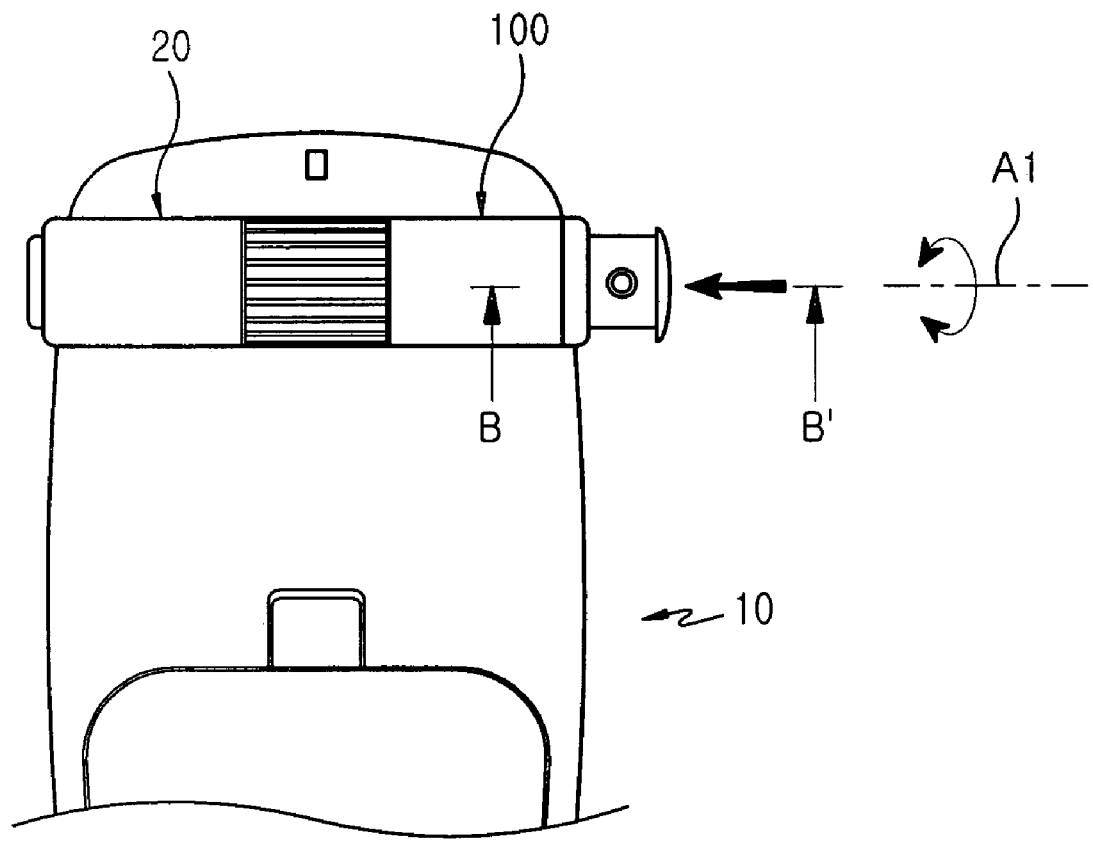
FIG. 18 is a rear view showing the inserting/drawing unit of the camera lens module according to the preferred embodiment of the present invention drawn out from the main body of the portable communication device.

As illustrated in FIGS. 16 and 18, the inserting/drawing unit 100 of the camera lens module 300 of the portable communication device is provided at the second housing 20. In a housing 200 of the inserting/drawing unit 100 is mounted a camera lens module 300, which includes a cylindrical lens housing 301 for accommodating a camera lens unit 45 therein, as shown in FIG. 6. At an outer circumferential surface of the lens housing 301 of the camera lens module 300 is formed a lens opening 301b through which a picture of an outer subject is taken. The lens housing 301 of the camera lens module 300 has an open end 302 through the camera lens unit 45 is inserted into the lens housing 301. The lens housing 301 of the cameral lens module 300 is provided at the other end opposite to the open end 302 with a plurality of saw-toothed portions 303 having inclined surfaces formed along the circumference of the lens housing 301. Inside the saw-toothed portions 303 are formed engagement grooves 304, in which engaging parts 401 formed at a rotary cam 400 are engaged. Consequently, the engaging parts 401 of the rotary cam 400 are engaged in the corresponding engagement grooves 304.

The rotary cam 400 extends in the longitudinal direction of the lens housing 301. In the saw-toothed portions 303 is formed a connection protrusion 306, which extends in the longitudinal direction of the lens housing 301. To the connection protrusion 306 is connected a shaft 900 having a coupling part 901 formed at one end thereof (shown in FIG. 17). In the connection protrusion 306 is formed a screw hole 306a, through which a screw 1000 is inserted so that the connection protrusion 306 is connected with the shaft 900. In the rotary cam 400 is mounted a bush ring 600 having a rib 601 through which the coupling part 901 of the shaft 900 is inserted. Between the connection protrusion 306 of the camera lens module 300 and the bush ring 600 is provided a second spring 702, which is arranged on the shaft 900. The second spring 702 provides an elastic force, by which the inclined surfaces of the saw-toothed portions 303 of the camera lens module 300 are separated from inclined surfaces 403a formed at the latching protrusions 403 of the rotary cam 400. Thus, the camera lens module 300 is drawn out from the housing 200 while being rotated about a hinge axis A1 (shown in FIG. 8) of the camera lens module 300. On the coupling portion 901 of the shaft 900 is fitted an O-ring 800, and the rotary cam 400 is rotatably attached to the lens housing 301. The lens housing 310 and the rotary cam 400 are mounted in the housing 200.

Figure 7:
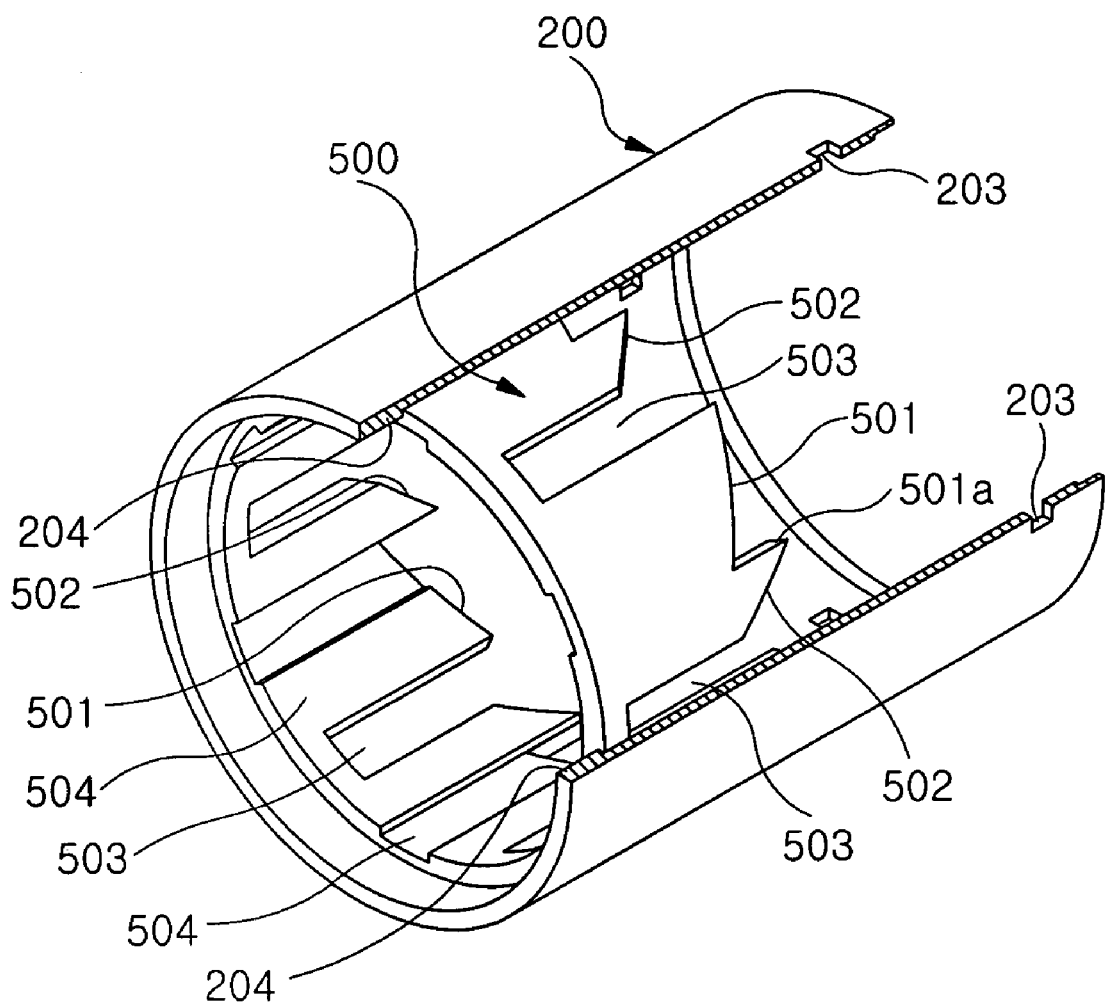
FIG. 7 is a perspective view in partial cut-away illustrating a housing and a stopper cam of the inserting/drawing unit of the camera lens module of the portable communication device according to the preferred embodiment of the present invention.

At one end of the housing 200 is provided a deco part 201 attached to the camera lens module 300 using at least one screw 1000. Consequently, the deco part 201 is inserted into or drawn out from the housing 200 with the camera lens module 300. The deco part 201 has at least one screw hole 201a formed at a region thereof, through which the screw 1000 is inserted. The screw 1000 is inserted into at least one screw-fixing hole 305 formed in the lens housing 301 of the camera lens module 300 through the screw hole 201a, and thus the deco part 201 is attached to the lens housing 301. At the outer surface of the deco part 210 is provided a deco cap 201b for protecting the deco part 201. The deco cap 201 has at least one insertion groove 201c in which the head of the screw 1000 is placed when the screw 100 is inserted through the screw hole 201a of the deco part 201. To the other end of the housing 200 is attached a spring cap 202 for supporting a first spring 701, which is provided between the spring cap 202 and the rotary cam 400 for providing an elastic force, by which the camera lens module 300 is inserted into or drawn out from the housing 200. On the outer circumferential surface of the spring cap 202 are formed a plurality of engagement portions 202a each having a protrusion 202b formed at one end thereof. The protrusions 202b of the engagement portions 202a are engaged in engagement grooves 203 formed at the housing 200. Consequently, the spring cap 202 is attached to the housing 200 by the engagement of the engagement portions 202a in the engagement grooves 203 of the housing 200. At a central part of the spring cap 202 is formed a spring fixing protrusion 202c for fixing and supporting the first spring 701. At the central part of the bush ring 600 is formed a bush ring fixing protrusion 602. Consequently, the second spring 702 is disposed between the camera lens module 300 and the bush ring 600, and the second spring 702 is fixed to the connection protrusion 306 of the camera lens module 300 and to the bush ring fixing protrusion 602. In the housing is provided a stopper cam 500, which releasably restricts the rotation of the rotary cam 400. Thus, the camera lens module 300 can be inserted into or drawn out from the housing 200 as the camera lens module 300 and the rotary cam 400 are rotated together with each other when the camera lens module 300 is pushed, as illustrated in FIG. 7. The stopper cam 500 is supported by a latching jaw 204 formed inside the housing 202.

Figure 8:
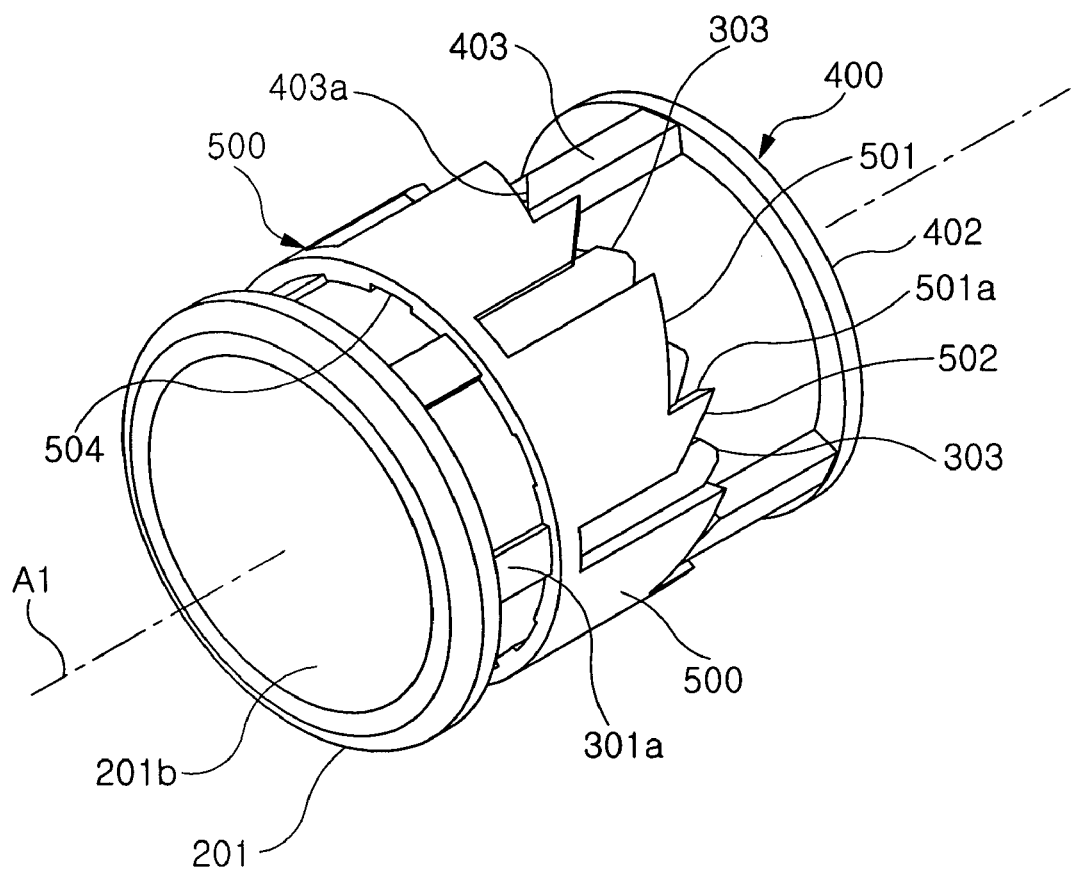
FIG. 8 is a perspective view of the inserting/drawing unit of the camera lens module of the portable communication device according to the preferred embodiment of the present invention illustrating the camera lens module inserted into the stopper cam.
Figure 9:
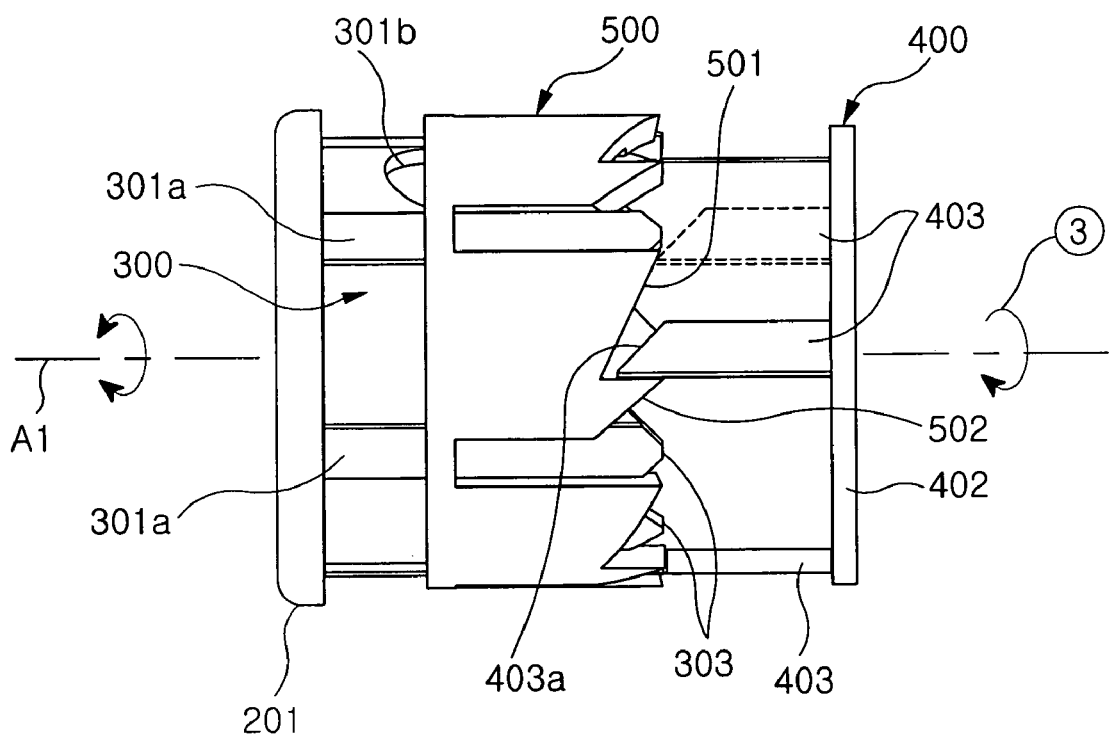
FIG. 9 is a side view of the inserting/drawing unit of the camera lens module of the portable communication device according to the preferred embodiment of the present invention illustrating latching protrusions of a rotary cam contacting first guide inclined surfaces of the stopper cam.
Figure 10:
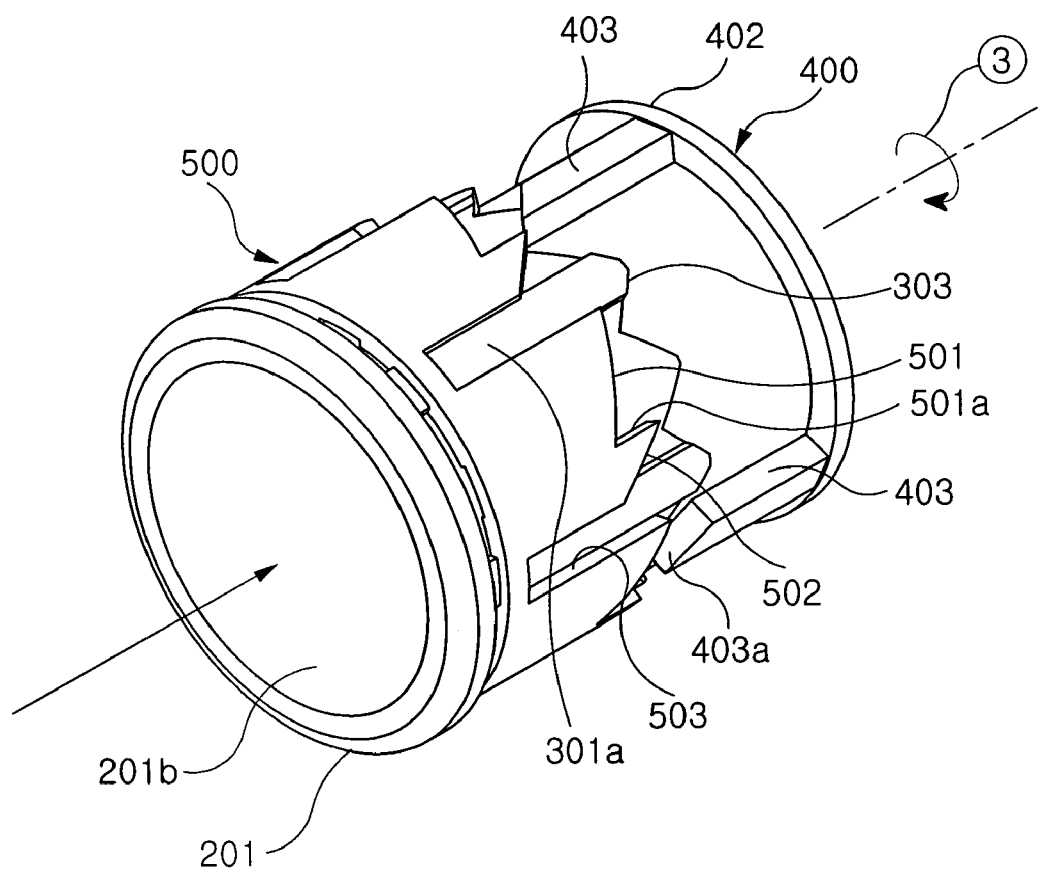
FIG. 10 is a perspective view of the inserting/drawing unit of the camera lens module of the portable communication device according to the preferred embodiment of the present invention illustrating the operation of the stopper cam.
Figure 11:
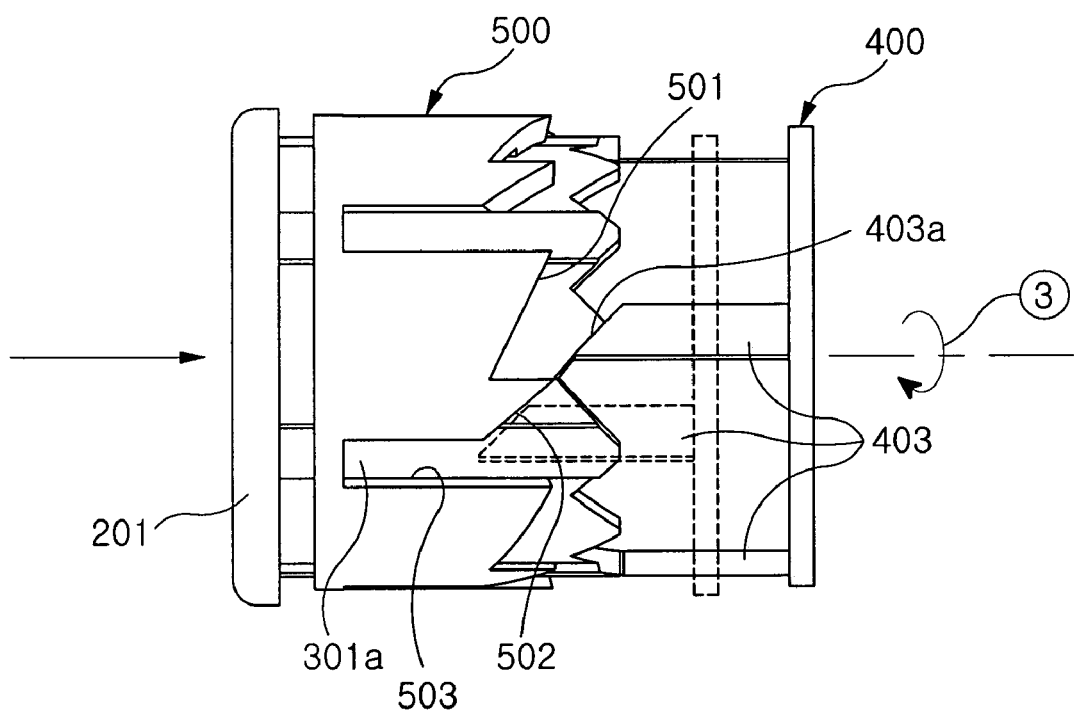
FIG. 11 is a side view of the inserting/drawing unit of the camera lens module of the portable communication device according to the preferred embodiment of the present invention illustrating the latch protrusions of the rotary cam guided by second guide inclined surfaces of the stopper cam.
Figure 12:
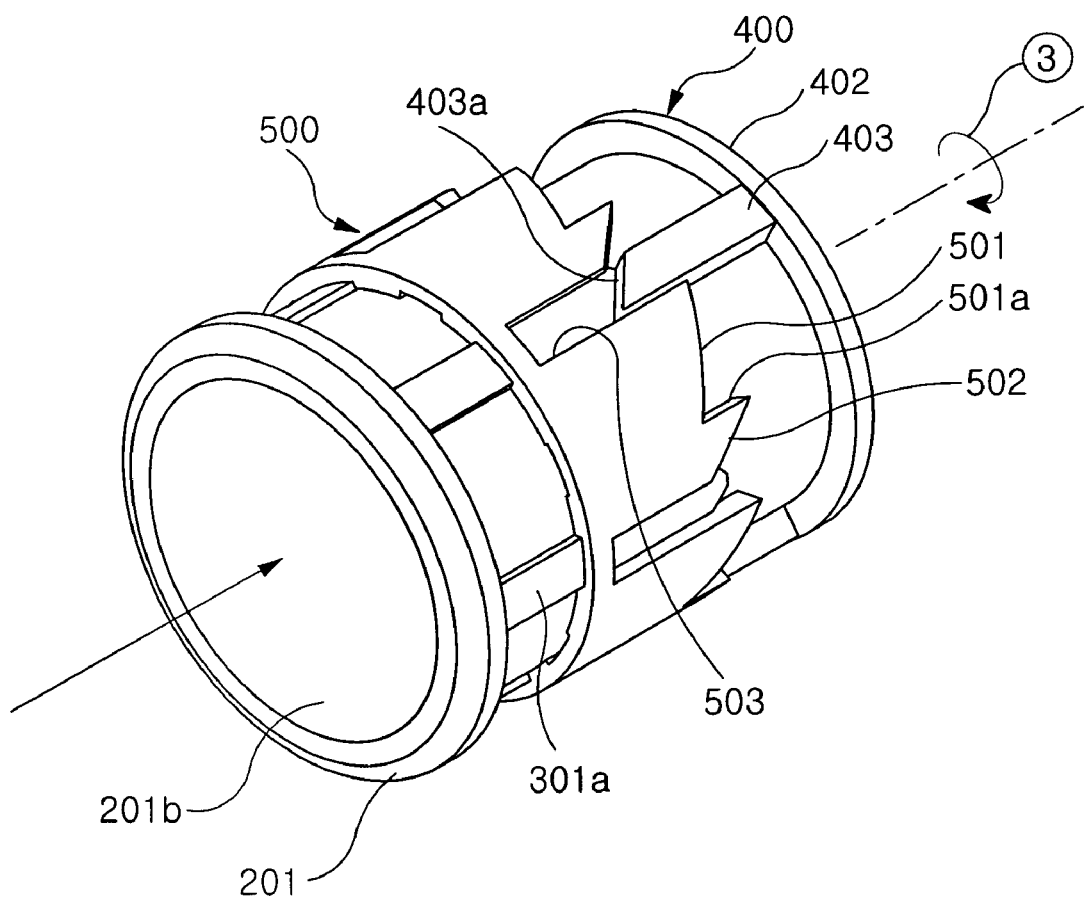
FIG. 12 is a perspective view of the inserting/drawing unit of the camera lens module of the portable communication device according to the preferred embodiment of the present invention illustrating the latching protrusions of the rotary cam guided into first guide grooves of the stopper cam.
Figure 13:
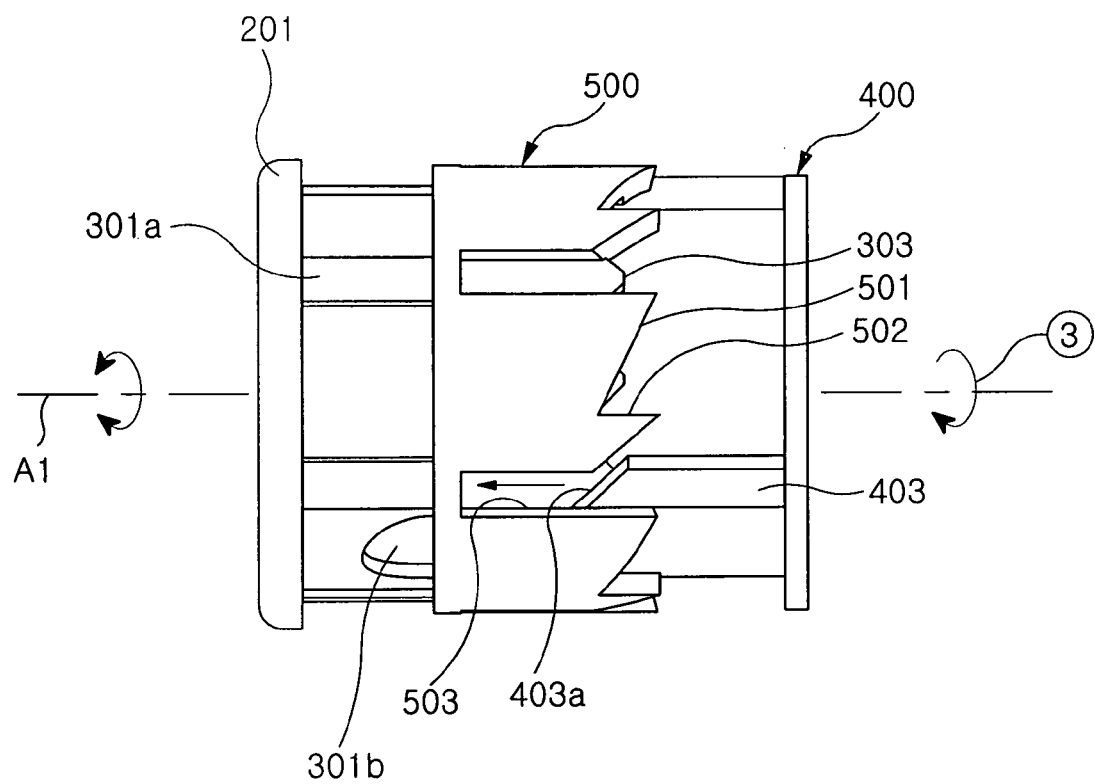
FIG. 13 is a side view of the inserting/drawing unit of the camera lens module of the portable communication device according to the preferred embodiment of the present invention illustrating the latching protrusions of the rotary cam guided into the first guide grooves of the stopper cam.
Figure 14:
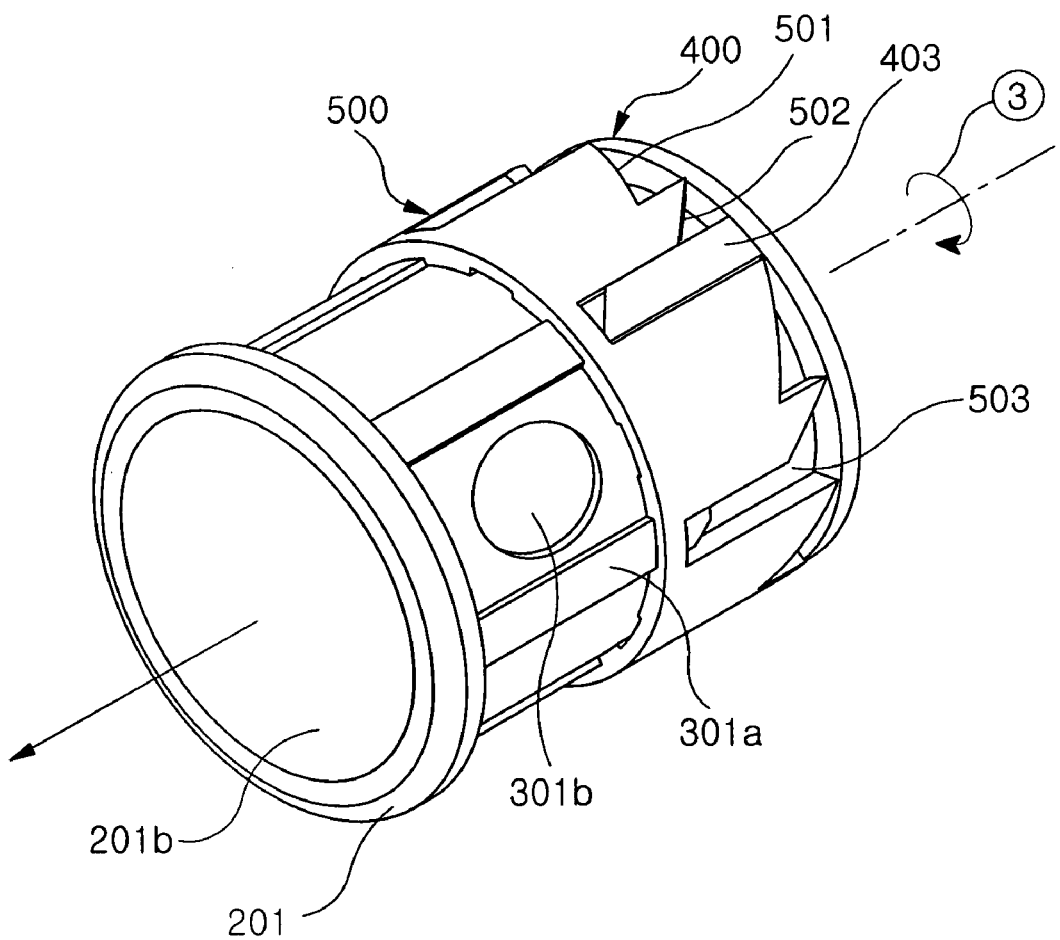
FIG. 14 is a perspective view of the inserting/drawing unit of the camera lens module of the portable communication device according to the preferred embodiment of the present invention illustrating the latching protrusions of the rotary cam guided into the first guide grooves of the stopper cam and guide protrusions of a lens housing guided into second guide grooves of the stopper cam.

When the camera lens module 300 is pushed as illustrated in FIGS. 8 and 9, the camera lens module 300 is drawn out from the housing 200 in the direction in which the camera lens module 300 is pushed. When the camera lens module 300 is pushed, the latching protrusions 403 of the rotary cam 400 are separated from latching jaws 501a of first guide inclined surfaces 501 of the stopper cam 500, as shown in FIGS. 10 and 11. The rotary cam 400 is rotated in a direction of rotation ③, and the latching protrusions 403 of the rotary cam 400 are moved to second guide inclined surfaces 502 of the stopper cam 500 while being rotated. In the stopper cam 500 is formed first guide grooves 503 which are formed in the longitudinal direction of the stopper cam 500 for guiding the latching protrusions 403 of the rotary cam 400. Consequently, the latching protrusions 403 of the rotary cam 400 are guided using the second guide inclined surfaces 502 and moved into the first guide grooves 503 while being rotated. The latching protrusions 403 of the rotary cam 400 are inserted into the first guide grooves 503 as illustrated in FIGS. 13 and 14.

Figure 15:
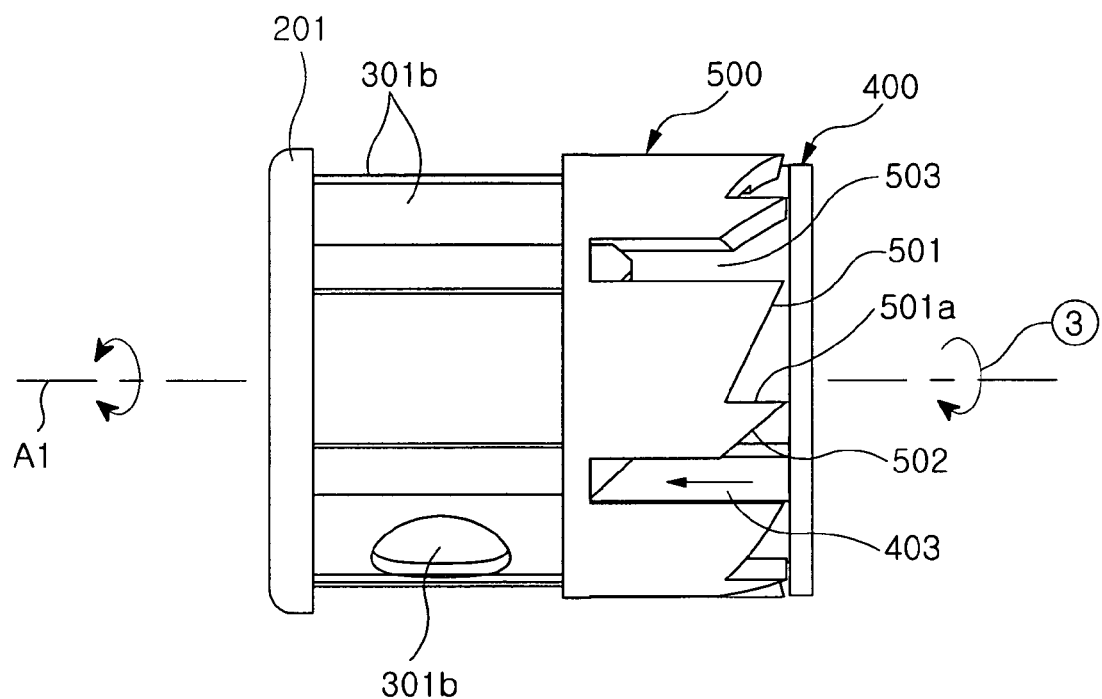
FIG. 15 is a side view of the inserting/drawing unit of the camera lens module of the portable communication device according to the preferred embodiment of the present invention illustrating the latching protrusions of the rotary cam guided into the first guide grooves of the stopper cam and the guide protrusions of the lens housing guided into the second guide grooves of the stopper cam.
Figure 17:
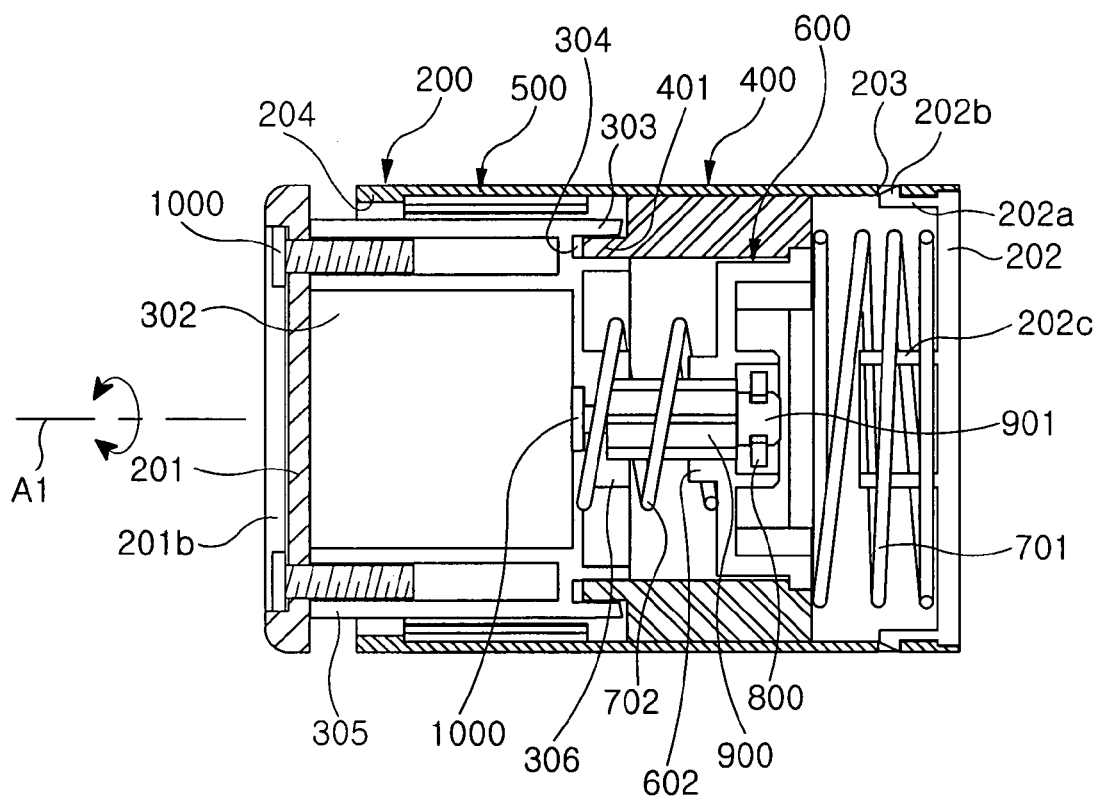
FIG. 17 is a cross-sectional view taken along the line A–A' of FIG. 16.
Figure 19:
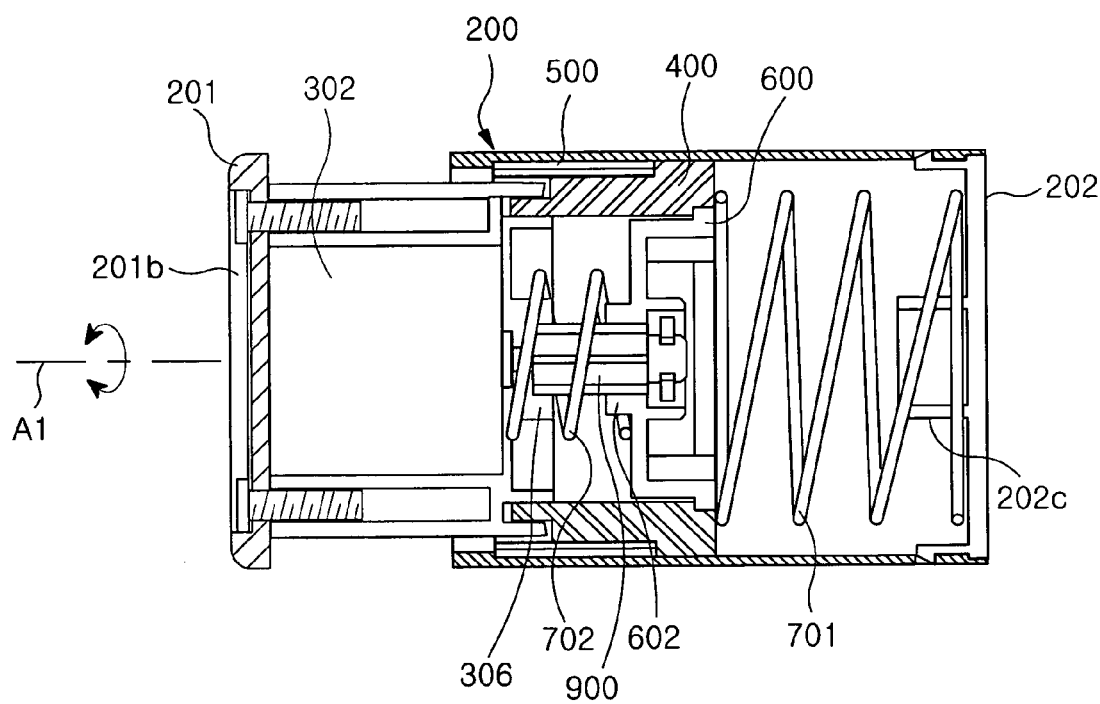
FIG. 19 is a cross-sectional view taken along the line B–B' of FIG. 18.
Figure 20:
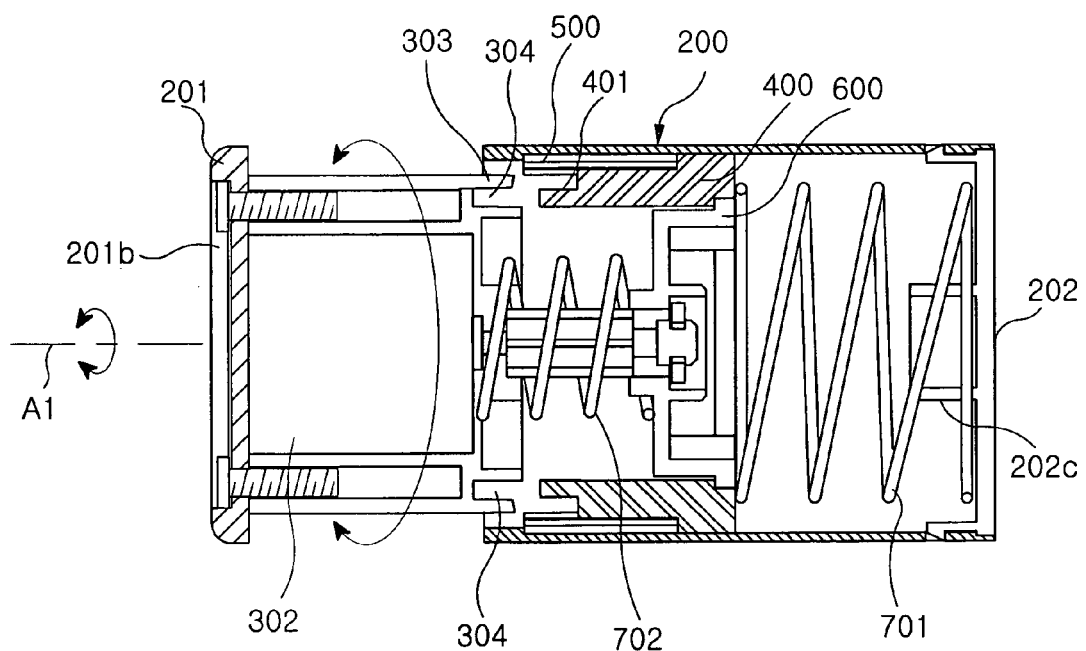
FIG. 20 is a cross-sectional view of the inserting/drawing unit of the camera lens module of the portable communication device according to the preferred embodiment of the present invention illustrating the operation of the camera lens module while the inserting/drawing unit of the camera lens module is drawn out from the main body of the portable communication device.

The lens housing 301 is drawn out from the housing 200 in the direction in which the lens housing 301 is pushed using the elastic force of the first spring 701. Inside the stopper cam 500 are provided second guide grooves 504, which are formed in the longitudinal direction of the stopper cam 500. In the second guide grooves 504 are engaged guide protrusions 301a of the lens housing 301. The rotary cam 400 has an undercut part 402 for restricting the drawing operation of the rotary cam 400 when the lens housing 301 and the rotary cam 400 are drawn out from the housing 200, as shown in FIG. 15. Consequently, the drawing operation of the stopper cam 500 is stopped when the stopper cam 500 contacts the undercut part 402 of the rotary cam 400. At the same time, the engaging parts 401 of the rotary cam 400 are disengaged from the engagement grooves 304 of the lens housing 301 using the elastic force of the second spring 702, as illustrated in FIGS. 19 and 20. Consequently, the lens housing 301 can be rotated about the hinge axis A1 of the camera lens module 300, as illustrated in FIG. 18. Under this condition, a picture of a subject can be taken using the camera lens unit 45 of the camera lens module 300. When the camera lens module 300 is inserted again into the housing 200 as illustrated in FIGS. 16 and 17, the engaging parts 401 of the rotary cam 400 are engaged into the engagement grooves 304 of the lens housing 301. The lens housing 301 and the rotary cam 400 are inserted into the housing 200. The guide protrusions 301a of the lens housing 301 are guided into the second guide grooves 504 of the stopper cam 500. The latching protrusions 403 of the rotary cam 400 are separated from the first guide grooves 503 of the stopper cam 500. As illustrated in FIG. 9, the latching protrusions 403 of the rotary cam 400 are moved to the first guide inclined surfaces 501 of the stopper cam 500 as the rotary cam 400 is moved in the direction ③ while being rotated. The latching protrusions 403 of the rotary cam 400 are guided to the latching jaws 501a of first guide inclined surfaces 501 of the stopper cam 500 along the first guide inclined surfaces 501 of the stopper cam 500. The latching protrusions 403 of the rotary cam 400 contact the latching jaws 501a, and the lens housing 301 remains inserted in the stopper cam 500.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable communication device comprising:
a first housing extending in a first direction;
a second housing extending in a second direction perpendicular to the first direction and formed at a bottom surface of the first housing so that a region of an outer circumferential surface of the second housing protrudes perpendicularly outward from the bottom surface of the first housing;
a camera lens module movably mounted in the second housing, and being rotatably movable with respect to the second housing the camera lens module being inserted into or drawn out from the second housing in the second direction by pushing the camera lens module;
a rotary cam extending in the longitudinal direction of the camera lens module and attached to the camera lens module; and
a stopper cam mounted in the second housing for releasably restricting rotation of the rotary cam so that the camera lens module can be inserted into or drawn out from the second housing as the camera lens module and the rotary cam are rotated together with each other when the camera lens module is pushed.

2. The device as set forth in claim 1, wherein the camera lens module is linearly movable with respect to the second housing.

3. The device as set forth in claim 1, further comprising a speaker unit, a display unit, a plurality of keys, and a microphone unit arranged on a top surface of the first housing.

4. The device as set forth in claim 1, wherein the second housing is formed in the shape of a cylinder, and wherein the camera lens module is formed in the shape of a cylinder.

5. The device as set forth in claim 1, wherein the camera lens module is operated in a pop-up fashion.

6. The device as set forth in claim 1, further comprising a camera lens mounted on an outer circumferential surface of the camera lens module, wherein the camera lens is exposed to the outside when the camera lens module is drawn out from the second housing.

7. The device as set forth in claim 1, wherein the camera lens module is mounted to an end of the second housing.

8. The device as set forth in claim 1, wherein the second housing is further provided at the middle part thereof with a lamp.

9. A portable communication device comprising:
an elongated housing;
a camera lens module mounted in the housing, the camera lens module being inserted into or drawn out from the housing in a direction along a hinge axis when it is pushed, the camera lens module being rotatable about the hinge axis when the camera lens module is drawn out from the housing;

a rotary cam extending in the longitudinal direction of the camera lens module and attached to the camera lens module;

a stopper cam mounted in the housing for releasably restricting the rotation of the rotary cam so that the camera lens module can be inserted into or drawn out from the housing as the camera lens module and the rotary cam are rotated together with each other when the camera lens module is pushed;

a bush ring mounted in the rotary cam, the bush ring having a rib for enabling a coupling part of a shaft attached to the camera lens module using a coupler such as a screw to be inserted therethrough; and a plurality of springs disposed in the housing for providing all elastic force necessary to insert the camera lens module into or draw out the camera lens module from the housing and for providing an elastic force necessary to separate the camera lens module from the rotary cam.

10. The device as set forth in claim 9, further comprising:
a deco part provided at one end of the housing, the deco part being attached to the camera lens module using at least one coupler such as a screw so that the deco part is inserted into or drawn out from the housing together with the camera lens module; and a spring cap provided at the other end of the housing for supporting one of the springs.

11. The device as set forth in claim 10, wherein the deco part has at least one screw hole formed at a predetermined region thereof for enabling the screw to be inserted therethrough, and further comprising a deco cap disposed at the outer surface of the deco part for protecting the deco part.

12. The device as set forth in claim 11, wherein the deco cap has at least one insertion groove formed so that the head of the screw is placed in the insertion groove when the screw is inserted through the screw hole of the deco part.

13. The device as set forth in claim 10, wherein the spring cap is provided at an outer circumferential surface thereof with a plurality of engagement portions, the engagement portions having protrusions engaged in engagement grooves formed at the housing, respectively, and wherein the spring cap is provided at the central part thereof with a spring fixing protrusion for fixing and supporting one of the springs.

14. The device as set forth in claim 9, wherein the housing is provided at an inside thereof with a latching jaw for fixedly supporting the stopper cam, the latching jaw being formed along an inner circumferential surface of the housing.

15. The device as set forth in claim 10, wherein the camera lens module further comprises:
a cylindrical lens housing for accommodating a cameral lens unit therein, the cylindrical lens housing having a lens opening formed at an outer circumferential surface thereof;
an open end formed at one end of the lens housing;
a plurality of saw-toothed portions formed along the circumference of the lens housing at the other end of the lens housing;
annular engagement grooves formed in the saw-toothed portions so that engaging parts formed at the rotary cam are engaged in the engagement grooves, respectively;
at least one screw-fixing hole formed in the lens housing so that the deco part is attached to the lens housing through the screw-fixing hole; and a connection protrusion formed at the center of the lens housing, the connection protrusion being fixedly attached to the shaft using a coupler such as a screw inserted therethrough.

16. The device as set forth in claim 15, further comprising at least one guide protrusion formed at an outer circumferential surface of the lens housing, the guide protrusion being engaged in at least one guide groove of the stopper cam for guiding the lens housing in the longitudinal direction of the lens housing.

17. The device as set forth in claim 16, wherein the rotary cam further comprises:
engaging parts formed at one end of the rotary cam and engaged in the engagement grooves of the lens housing;
an undercut part formed at the other end of the rotary cam for restricting the drawing operation of the rotary cam when the camera lens module and the rotary cam are drawn out from the housing; and
at least one latching protrusion formed at an outer circumferential surface of the rotary cam in a longitudinal direction of the rotary cam, the latching protrusion having an inclined surface corresponding to an inclined surface of the saw-toothed portions of the lens housing.

18. The device as set forth in claim 17, wherein the stopper cam further comprises:
at least one first guide inclined surface formed along an outer circumferential surface of the stopper cam, the first guide inclined surface being rotated in one direction when the lens housing is inserted into or drawn out from the housing;
at least one second guide inclined surface formed along the outer circumferential surface of the stopper cam, the second guide inclined surface being rotated in one direction when the lens housing is inserted into or drawn out from the housing;
at least one first guide groove formed in the stopper cam in a longitudinal direction of the stopper cam for guiding at least one latching protrusion of the rotary cam; and
at least one second guide groove formed in the stopper cam in the longitudinal direction of the stopper cam, the guide protrusion of the lens housing being guided into the second guide groove.

19. The device as set forth in claim 18, further comprising at least one latching jaw formed at the lower end of the first guide inclined surface, wherein the latching protrusion of the rotary cam is separated from the first guide groove and moved along the first guide inclined surface in one direction to rotate the rotary cam when one side of the lens housing is pushed to insert the lens housing into the housing, whereby the latching protrusion of the rotary cam contacts the latching jaw, and wherein the latching protrusion of the rotary cam is separated from the latching jaw and moved along the second guide inclined surface in one direction to rotate the rotary cam when one side of the lens housing is pushed again to draw out the lens housing from the housing, whereby the lens housing is drawn out from the housing while being guided along the first guide groove of the stopper cam.

20. The device as set forth in claim 18, wherein the first guide inclined surface is longer than the second guide inclined surface.

21. The device as set forth in claim 9, further comprising an O-ring fitted on the coupling part of the shaft for fixing the shaft.

22. The device as set forth in claim 15, wherein the springs further comprise:
- a first spring disposed between the spring cap attached to a side of the housing and the rotary cam; and
- a second spring disposed between the camera lens module and the bush ring and arranged on the shaft for providing the elastic force necessary to separate the camera lens module from the rotary cam so that the camera lens module is drawn out from the housing while being rotated.

23. The device as set forth in claim 22, wherein the second spring is connected to the connection protrusion of the camera lens module at one end thereof, and the second spring is connected to a bush ring fixing protrusion formed at the central part of the bush ring at the other end thereof.

24. A portable communication device comprising:
- a first housing extending in a first direction;
- a second housing extending in a second direction perpendicular to the first direction and formed at a bottom surface of the first housing so that a region of an outer circumferential surface of the second housing protrudes perpendicularly outward from the bottom surface of the first housing;
- a camera lens module movably mounted in the second housing, and being rotatably movable with respect to the second housing, the camera lens module for being inserted into or drawn out from the second housing in the second direction by pushing the camera lens module;
- a rotary cam extending in the longitudinal direction of the camera lens module and attached to the camera lens module;
- a stopper cam mounted in the second housing for releasably restricting rotation of the rotary cam so that the camera lens module can be inserted into or drawn out from the second housing as the camera lens module and the rotary cam are rotated together with each other when the camera lens module is pushed; and
- a bush ring mounted in the rotary cam, the bush ring having a rib for enabling a coupling part of a shaft attached to the camera lens module using a coupler such as a screw to be inserted therethrough.

* * * * *